J. W. BUTTS.
PIPE FITTING.
APPLICATION FILED MAY 7, 1914.
1,126,386.
Patented Jan. 26, 1915.
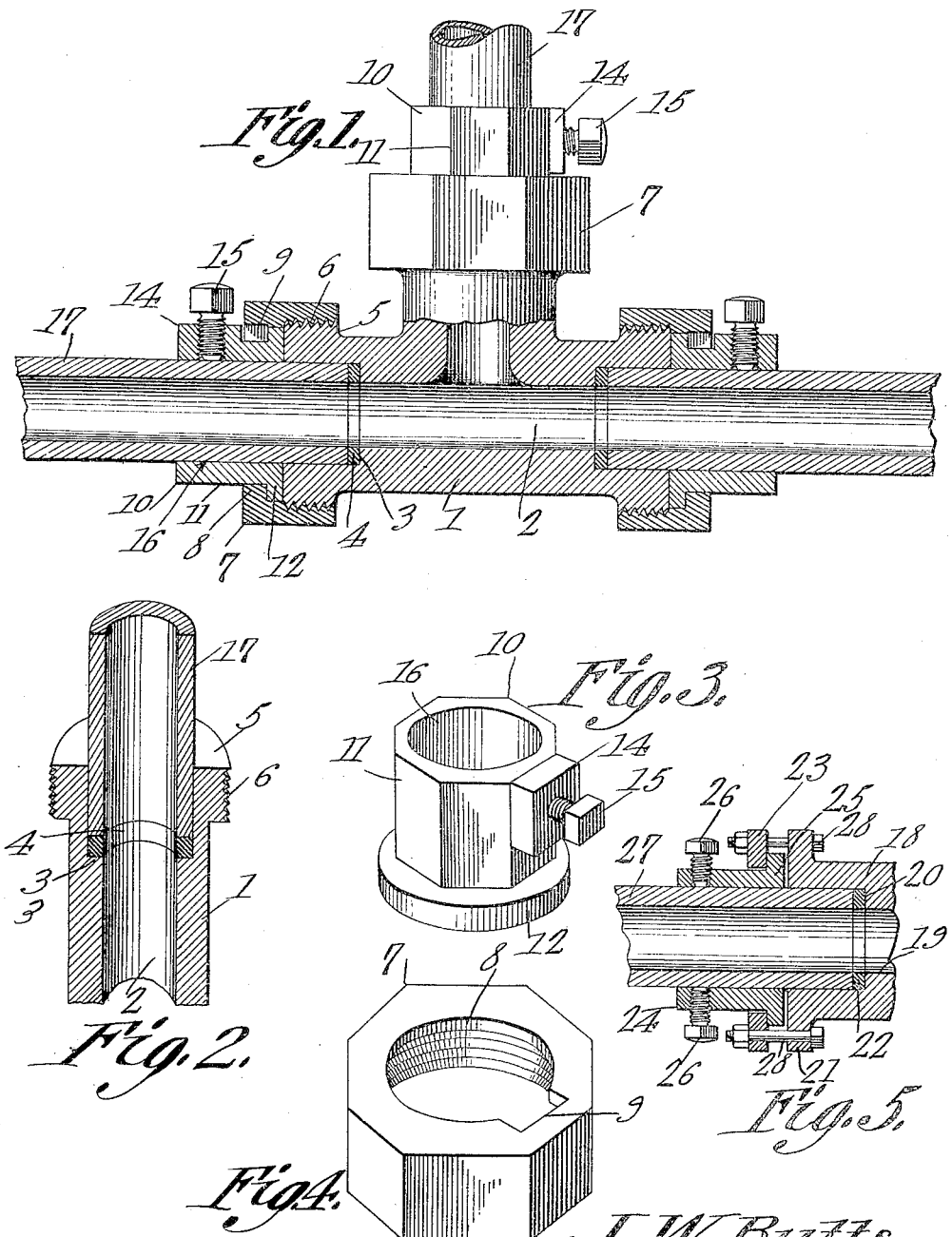

UNITED STATES PATENT OFFICE.

JOHN WILBURN BUTTS, OF ATLANTA, GEORGIA.

PIPE-FITTING.

1,126,386.  Specification of Letters Patent.  Patented Jan. 26, 1915.

Application filed May 7, 1914. Serial No. 837,033.

*To all whom it may concern:*

Be it known that I, JOHN W. BUTTS, a citizen of the United States, residing at Atlanta, in the county of Fulton and State of Georgia, have invented a new and useful Pipe-Fitting, of which the following is a specification.

The device forming the subject matter of this application is a pipe coupling, and one object of the present invention is to provide novel means whereby a smooth, unthreaded pipe, may be made to coöperate with another pipe, to form a water tight joint.

Another object of the invention is to provide a pipe coupling of simple form which will permit a longitudinal adjustment therein of a smooth pipe.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawing:—Figure 1 shows the invention in sectional elevation; embodied in the form of a T; Fig. 2 is a longitudinal section showing the meeting ends of the pipes; Fig. 3 is a perspective of the thimble; Fig. 4 is a perspective of the nut; Fig. 5 is a longitudinal section showing a modification.

In the drawing there is shown a pipe denoted generally by the numeral 1 and hereinafter referred to as the outer pipe, the pipe 1 being, if desired, in the form of a T, each end of the T being provided with a coupling mechanism but one of which need be described.

The bore 2 of the pipe 1 is enlarged to form a shoulder 3 supporting a yieldable gasket 4. At its outer end, the pipe 1 is provided with a projecting flange 5 which is peripherally threaded as shown at 6. A carrying member is provided, the same in the present instance being in the form of a nut 7 provided at one end with an inwardly projecting flange 8 having an opening 9. The nut 7 is threaded onto the threaded flange 5 of the pipe 1.

Lying within the nut 7 is a thimble 10 having exterior wrench faces 11 and provided with a flange 12 which engages the inner face of the flange 8 on the nut. The thimble 10 is equipped with a reinforcing lug 14 into which is threaded a set screw 15 or other clamping device, adapted to enter the smooth bore 16 of the thimble and to hold in place an inner pipe 17.

In practical operation, the inner pipe 17 is slid longitudinally in the thimble 10 until the inner end of the pipe 17 is as close as possible to the gasket 4. Then, the set screw 15 is tightened up to hold the pipe 17 in its adjusted position. Then, the nut 7 is rotated on the pipe 1, the flange 8 coacting with the flange 12 to advance the pipe 17 until the inner end thereof is bound firmly against the washer or gasket 4.

It is to be observed that the flange 8 of the nut 7 is journaled for rotation between the lug 14 and the flange 12. When the nut 7 is reversely rotated, the flange 8 coacts with the lug 14 to back up the thimble 10 positively, and thus effect a separation of the pipes 1 and 17, should the same be rusted together. The thimble 10 may be separated readily from the nut 7 by first removing the set screw 15 and then permitting the lug 14 to pass through the opening 9. However, when the set screw 15 is in place in the lug 14, the thimble cannot become disengaged accidentally from the nut.

In Fig. 5 of the drawings, a modified form of the invention is shown. In said figure, the outer pipe is shown at 18 and the bore 19 thereof is enlarged to form an internal shoulder 20 against which rests a gasket or washer 22. The pipe 18 is provided with a terminal flange 21. The carrying member is in the form of a plate 23 through which the thimble 24 passes, the latter having a flange 25 which engages the inner face of the carrying member or plate 23. Set screws 26 pass through the thimble 24 and engage the inner pipe 27. The carrying member or plate 23 is operatively connected with the flange 21 of the main pipe 18 through the medium of bolts 28 or the like. The structure above described does not differ materially in operation from the structure originally set forth, and a more detailed description than that above given is considered unnecessary.

Having thus described the invention, what is claimed is:—

1. In a device of the class described, an outer pipe having its bore enlarged to form a shoulder; a carrying member; a thimble mounted in the carrying member and having a flange engaging the inner face of the carrying member; an inner pipe longitudinally adjustable in the thimble with respect to the shoulder; means upon the thimble and engaging the inner pipe to hold the latter in adjusted positions with respect to the shoulder; and an operative connection between the main pipe and the carrying member for moving the carrying member, the thimble and the inner pipe, to cause the end of the inner pipe to coöperate with the shoulder.

2. In a device of the class described, an outer pipe having its bore enlarged to form a shoulder; a nut threaded on the pipe and having a flange; a thimble upon which the nut is rotatable, the thimble being provided with a flange which engages the inner face of the flange of the nut, the thimble having a smooth bore; an inner pipe adjustable longitudinally in the smooth bore of the thimble, with respect to the shoulder; and a clamping device in the thimble and engaging the inner pipe to hold the latter in adjusted positions, the nut being rotatable upon the outer pipe to advance the thimble and the inner pipe, thereby to cause one end of the inner pipe to coöperate with the shoulder.

3. A pipe coupling comprising a thimble provided with a flange and having a reinforcing lug; a removable clamping device in the lug and coöperating with the bore of the thimble; and a nut having a flange journaled between the flange of the thimble and the lug, the flange of the nut having an opening through which the lug is adapted to pass, the clamping device coöperating with the nut to prevent the passage of the lug through the opening.

In testimony that I claim the foregoing as my own, I have hereto affixed my signature in the presence of two witnesses.

JOHN WILBURN BUTTS.

Witnesses:
O. H. ALLEN,
J. T. FREEMAN.

Copies of this patent may be obtained for five cents each, by addressing the "Commissioner of Patents, Washington, D. C."